April 1, 1941.    F. W. COTTERMAN    2,237,025
CENTRIFUGALLY CONTROLLED AUTOMOTIVE TRANSMISSION GEAR
Filed Nov. 7, 1938    3 Sheets-Sheet 1
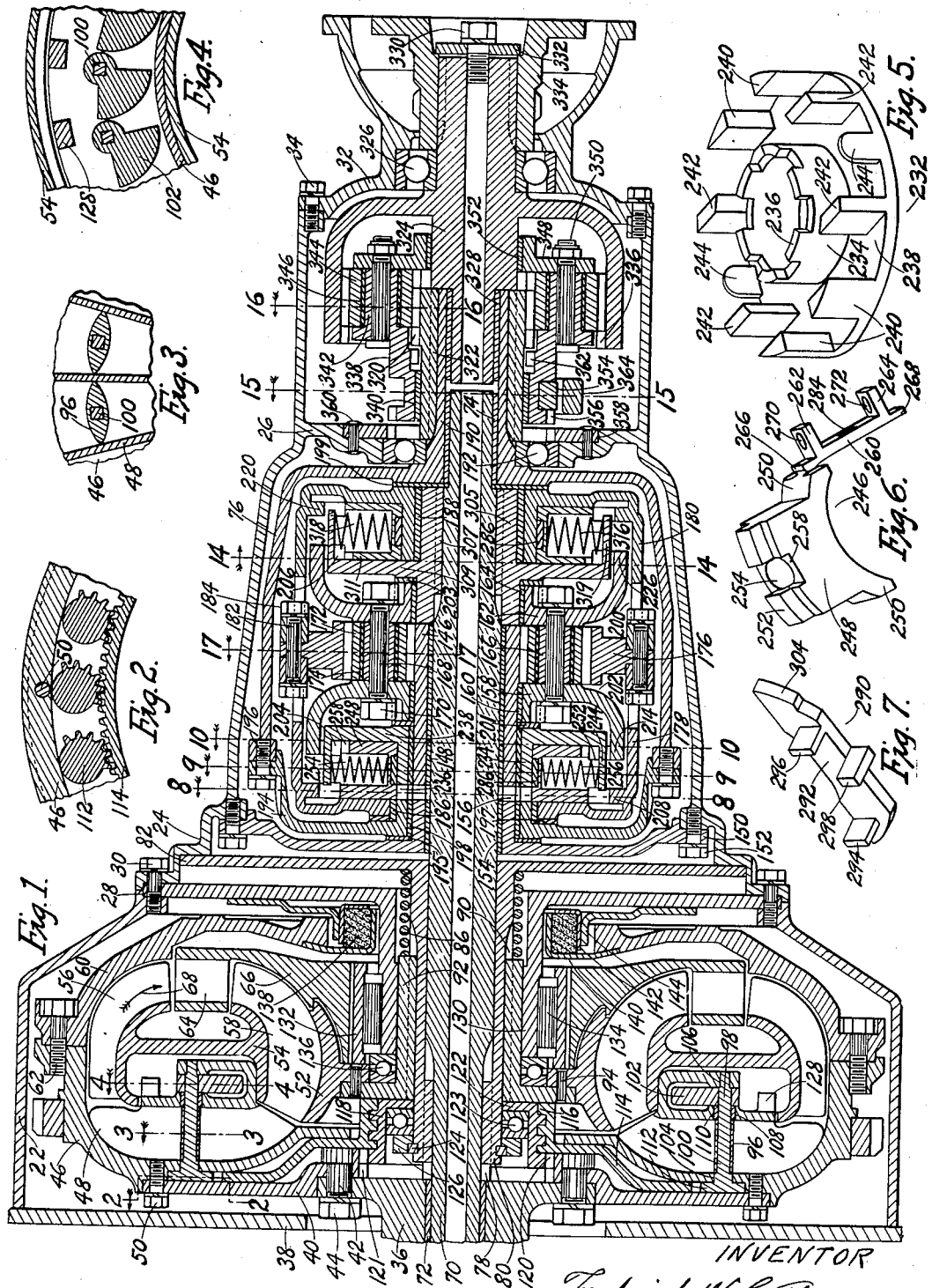
INVENTOR
Frederick W. Cotterman

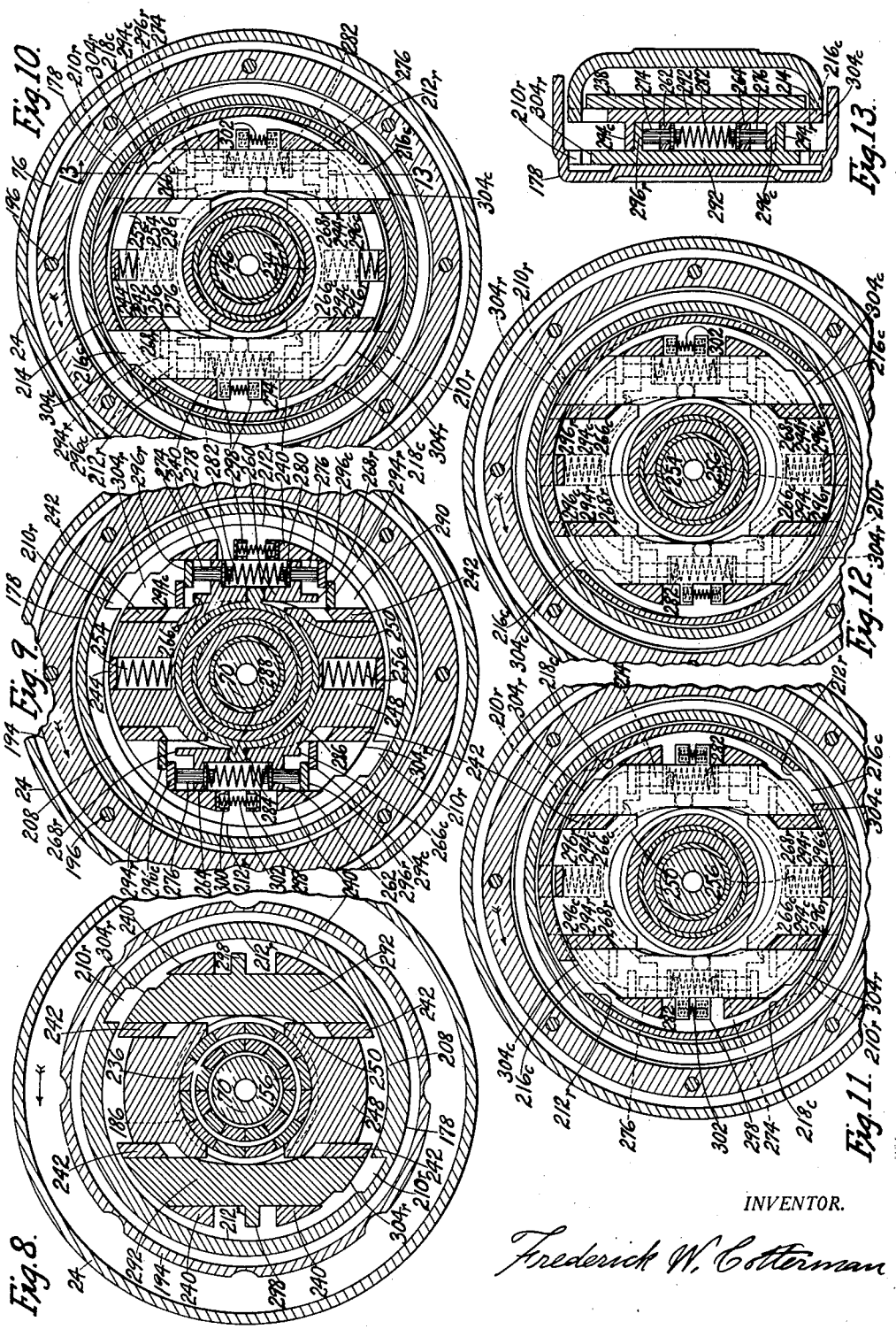

April 1, 1941. F. W. COTTERMAN 2,237,025
CENTRIFUGALLY CONTROLLED AUTOMOTIVE TRANSMISSION GEAR
Filed Nov. 7, 1938 3 Sheets-Sheet 3
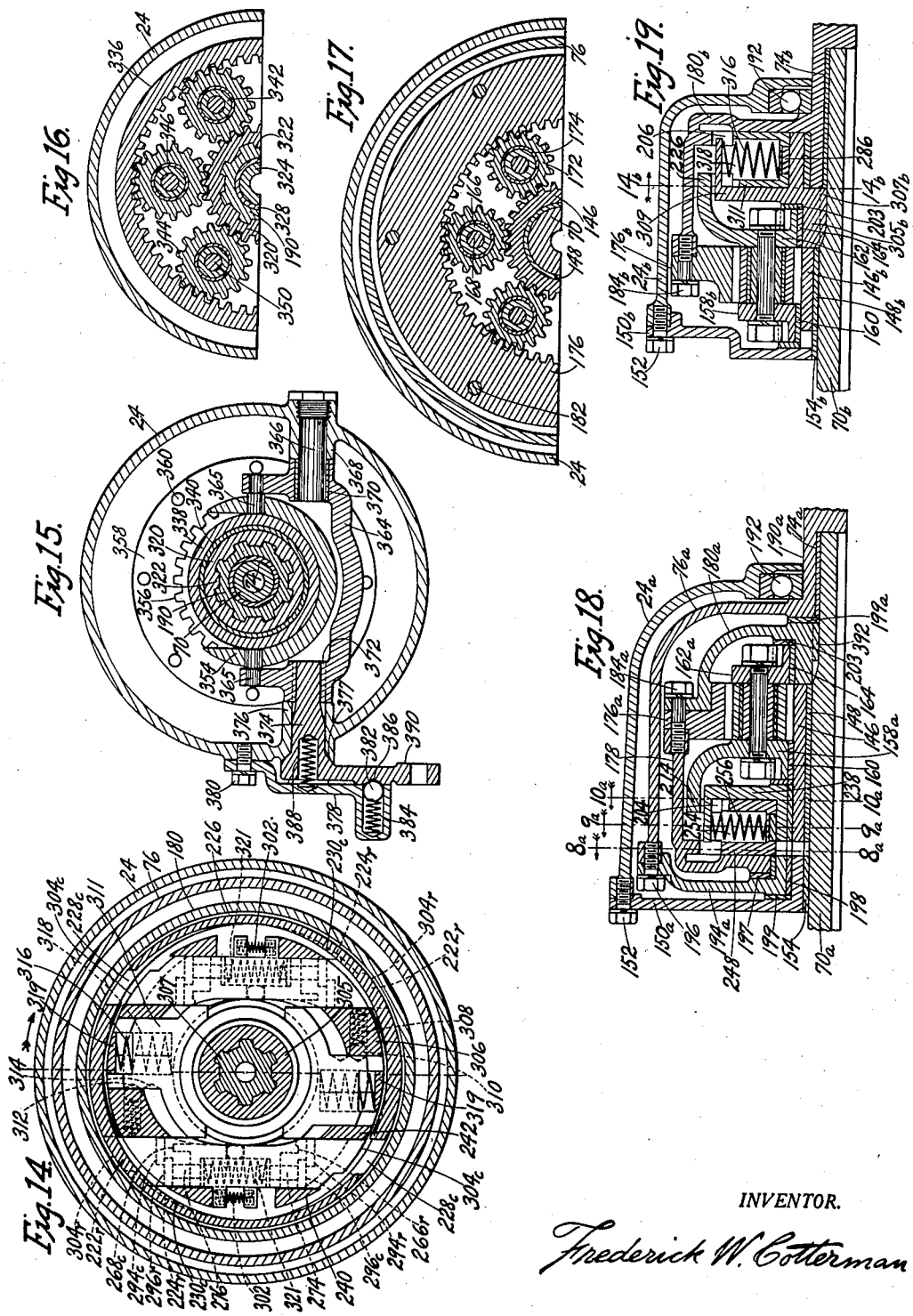
INVENTOR.
Frederick W. Cotterman Patented Apr. 1, 1941

2,237,025

UNITED STATES PATENT OFFICE 2,237,025

CENTRIFUGALLY CONTROLLED AUTOMOTIVE TRANSMISSION GEAR

Frederick W. Cotterman, Dayton, Ohio, assignor of one-half to Bessie D. Apple, Dayton, Ohio Application November 7, 1938, Serial No. 239,224

24 Claims. (Cl. 74—260)

This invention relates to power transmission mechanism for connecting a driving and driven member in variable speed ratio, and particularly to that type of transmission wherein a turbine is combined with toothed gearing to provide a more extended range. It is particularly adapted to automotive use, and comprises a structure somewhat similar to that shown in my Patent 2,134,398 of October 25, 1938, and my copending applications Serial No. 194,637, filed Mar. 8, 1938, Serial No. 148,751, filed June 17, 1937, and Serial No. 180,174, filed Dec. 16, 1937.

The hydraulic unit of the mechanism is of the class which operates both as a fluid clutch and a torque multiplying turbine. It comprises an impeller, a rotor in two stages, and a stator between the stages. The impeller or input member is secured to the engine, the rotor being the output member of the unit.

One of the difficulties with a hydraulic unit of this class is that the functions of clutch and torque multiplier are inconsistent, i. e., in a perfect torque multiplier, the lower the output member speed for a given input member speed the greater the torque multiplication, whereas as a clutch it would be desirable if the impeller, when revolving at the engine idling speed of several hundred R. P. M., would impart zero torque to the rotor.

To obviate this difficulty, in mechanisms of this class, means have been added to restrain the flow of fluid through the impeller by blocking the space between the impeller blades by valves.

These valves are normally closed, but are provided with centrifugal weights which act at a predetermined speed to open the valves. By this means the impeller does not act as an impeller until a considerable engine speed is reached. Below the predetermined speed, therefore, the impeller has better releasing qualities, such as are required of a clutch that is intended to automatically release when the engine is lowered to its idling speed.

Even when such valves are provided there is still considerable impeller drag on the rotor due to the fact that part of the hydraulic fluid is in the impeller and part in the rotor and there is therefore a tendency for the rotating part of the fluid to adhere to the nonrotating part.

It is therefore an object of this invention to provide a combined hydraulic and geared device of the character described with a brake for holding the rotor stationary against the impeller drag, the brake being operable on and off through a mechanical connection between the impeller valves and the brake, whereby, when the valves open to cause the impeller to become effective to drive the rotor, the brake automatically releases the rotor to be driven, to the end that certain connections for forward and reverse running which are preferably made to the rotor shaft when it is non-rotative may be effected by bringing the engine to its idling speed.

The reverse gear portion of the mechanism comprises toothed members which must be manually shifted into mesh with each other for forward and reverse gear ratios.

In a hydraulic unit of the character shown, the impeller, rotor and stator cannot be so designed as to be efficient as a torque multiplier over a very wide range of speed, the efficiency as a torque multiplier being highest when the relative speeds of the several members are those for which the mechanism was designed. It follows that, for driving a vehicle the maximum speed of which is more than ten times the minimum, a transmission gear set of rather wide ratio changing capacity is desirable.

In view of the limited speed range within which the hydraulic portion of the unit described is efficient, it is a further object of the invention to provide a transmission gear box whereby, rather than pull the hydraulic unit down to a ratio at which it multiplies torque at low efficiency, a step down in the gear box, i. e., an underdrive is normally operative to allow the hydraulic unit to operate at less reduction between the impeller and rotor for the same engine-to-wheel ratio, with means to automatically change the gearing for direct drive and for overdrive as the vehicle speed increases.

In view of the fact that vehicle speeds must vary from 5 to 90 m. p. h., whereas the present internal combustion engines may not be varied efficiently over more than one-fourth as great a range, it is a further object of this invention to extend the ratio variation through the mechanism by employing gear means and connections therefor, whereby there may be had through the transmission gearing, an underdrive, a direct drive, and an overdrive ratio, one or another of which is at all times in series with the hydraulic unit, which, being responsive to both speed and torque, will vary by infinitesmal ratio changes depending on similar variations in the balance as between the power applied and the vehicle resistance interposed thereto.

Another object is to so construct and arrange and to so connect the several elements of the transmission gear box that by automatically making a single additional connection between two of the elements, and unmaking a connection already made, a direct drive ratio will result, and by automatically making another single additional connection between two other of the elements, and unmaking a connection already made, an overdrive ratio will result.

Another object is to provide gearing wherein a single planetary gear train has the reaction gear of the train positively and permanently connected to the housing to prevent rotation whereby it is held against backward rotation for underdrive and against forward rotation for overdrive together with means to effect direct drive through the gear mechanism without releasing the reaction gear from its permanent connection.

Another object is to so construct the clutch mechanism of the transmission gear set that there will be positive two-direction driving connections between the several elements, in underdrive, in direct drive, and in overdrive, and so that when a shift from one ratio to the other is taking place the clutch, which must be made to let go of one element and take hold of a second always takes hold of the second before it releases the first, to the end that there will be no free wheeling, either in underdrive, in direct drive, in overdrive, or during the transition period in the shift from any one drive to another.

Other objects and advantages will become apparent as the invention is further described and reference is made to the drawings, wherein, Fig. 1 is a longitudinal, vertical, axial section through the entire mechanism.

Fig. 2 is a fragmentary transverse section taken at 2—2 of Fig. 1, showing part of the mechanism whereby the impeller valves and the rotor brake are compelled to operate in unison.

Fig. 3 is a fragmentary transverse section, taken at 3—3 of Fig. 1, showing several of the impeller blades.

Fig. 4 is a fragmentary transverse section, taken at 4—4 of Fig. 1, showing the centrifugal weights for operating the impeller valves and the rotor brake simultaneously.

Fig. 5 is a detail perspective view of the frame of one of the transmission clutches.

Fig. 6 is a detail perspective view of one of the centrifugal weights for operating one of the transmission clutches.

Fig. 7 is a detail perspective view of one of the pawls which cooperate with the weights in the transmission clutches.

Figs. 8, 9, and 10 are transverse sections through Fig. 1 at 8—8, 9—9, and 10—10 respectively, showing different parts of the transmission clutch which shifts to change from underdrive to direct drive.

Figs. 11 and 12 are views similar to Fig. 10 except that they show a transmission clutch in the several operative steps incident to shifting from one ratio to the other.

Fig. 13 is a longitudinal section taken at 13—13 of Fig. 10, showing the pawl operating mechanism of a transmission clutch.

Fig. 14 is a transverse section taken through Fig. 1 at 14—14, showing the transmission clutch provided for shifting from direct drive to overdrive.

Fig. 15 is a transverse section through the manually operable portion of the reversing gear mechanism.

Fig. 16 is a transverse half section through the reversing gearing.

Fig. 17 is a transverse half section through the transmission gearing.

Fig. 18 is a longitudinal, vertical, axial half section through a modification of the transmission mechanism adapting it for use as an underdrive gear box only.

Fig. 19 is a longitudinal, vertical, axial half section through a modification of the transmission mechanism adapting it for use as an overdrive gear box only.

Construction

At the forward end, a housing 22 contains the hydraulic unit. A smaller housing 24 contains the underdrive-direct drive-overdrive gear set and the forward reverse gear set, the two gear sets being separated by the partition 26. For brevity in description the forward gear set may hereinafter be referred to as the transmission gears and the rearward gear set as the reversing gears. A partition plate 28 is interposed between the housings 22 and 24, the housings and plate being held together by the screws 30. A rear bearing head 32 is secured to the rear end of the housing 24 by the screws 34.

Within the forward section, the crank shaft 36 of an engine 38 has the impeller plate 40 secured thereto by the bolts 42 and nuts 44. The impeller 46 has blades 48 and is secured to the plate 40 by the screws 50.

The rotor comprises a main body 52, a core 54, first stage blades 56 and second stage blades 58. An impeller cover 60 is secured to the impeller 46 by the screws 62. The cover 60 fits as closely around the rotor blades 56 as will permit rotation at different speeds between the two parts.

At the rearward side of the rotor and between the first and second stage blades 56 and 58 are the stator blades 64. The stator blades 64 are supported on the stator body 66, and are so angled that movement of a fluid by the first stage blades 56 toward the second stage blades 58 in the direction of the arrow 68 impinges on the stator blades 64 to drive the rotor forward, by forward being meant clockwise when standing at the left of the drawing.

The rotor shaft 70 has rotative bearing at the forward end in the bearing bushing 72 which is press fitted in the crank shaft 36, and at the rearward end in the bearing bushing 74 which is press fitted in the hub 190 of the transmission output member 76.

The forward end of the rotor shaft 70 has external splines 78 over which the internal splines of the rotor brake hub 80 are axially slidable. At the rear end of the hub 80, the rotor brake flange 82 extends outwardly and normally is held in contact with the interior face of the housing 24 by the spring 86.

The brake hub 80 has external splines 90 axially slidable in the internal splines of the rotor hub 92. Rotor hub 92 is secured in the rotor body 52 by rivets 94.

Between the impeller blades 48 are the butterfly valves 96. The valve stems 98 are squared at 100 where they pass through the valves 96 and centrifugal weights 102 and rounded at 104 and 106 where they have bearing in the impeller. A center bearing is provided at 108 by means of a collar 110 which is round externally for rotation in the impeller and squared internally to fit the valve stem. Pinion segments 112 are integral with the stems 98 and are in constant mesh with a large but narrow faced gear 114 which has limited rotative movement between the impeller plate 40 and the impeller 46.

The hub of the gear 114 has a coarse pitch multiple internal thread 116 which fits over corresponding external threads on the outside of a collar 118.

At the forward end, the collar 118 has an outwardly extending flange which has external teeth 120 axially slidable in corresponding internal teeth 121 in the impeller plate 40, whereby the collar 118 must always rotate in unison with the impeller but may move axially with respect thereto.

At the rearward end, the collar 118 has an inwardly extending flange 122 against which an antifriction end thrust bearing 123 rests. A split ring 124 extends into an annular groove in the forward end of the brake hub 80, and a collar 126 surrounds the halves of the ring to hold it together.

The thread 116 is such that when the centrifugal weights 102 swing outwardly on the stems 98 until the weights touch the stops 128 and thereby turn the segments 112 to rotate the gear 114, the collar 118 will be drawn forwardly against the resistance of the spring 86 to the rear face of the crank shaft 36, thereby drawing the flange 82 well into a disengaged position. Inward swinging of the weights 102 is limited only by engagement of the flange 82 with its seat in the housing 24. The brake is therefore preferably so fitted to its seat in the housing that the weight will swing inwardly slightly less than to the position shown when the brake is new and slightly more than to the position shown when the brake has been in operation a number of years. In this way no adjustment is required.

A long hub 130 extends forwardly from the partition plate 28 and is a close running fit over the rotor hub 92. The stator body 66 is splined over a hub 132 which is internally formed to receive the combination roller bearing and roller clutch 134. The hub 130 is externally formed for the combined roller brake and bearing whereby the stator may rotate forwardly but never backwardly.

A thrust bearing 136 holds the rotor to its forward position. A felt seal washer 138 held by retainers 140, 142, and 144, keeps the hydraulic fluid from leaking out into the housing 22. The hydraulic unit is shown as it appears when at rest or when the engine is rotating at idling speed, the valves 96 being closed to render the impeller inoperative as such and the rotor brake 82 being engaged to hold the rotor in a non-rotative state.

The hydraulic unit above described, is shown and claimed in my copending Patent 2,134,398 of October 25, 1938, and my copending application Serial No. 194,637, filed March 8, 1938, and is herein described because it is necessarily included to provide a complete operative structure.

Midway of the partitions 26 and 28 in the housing 24 is the transmission gear set which provides underdrive, direct drive, and overdrive. The sun gear 146 has a long bearing bushing 148 press fitted therein, the rotor shaft 70 being runningly fitted in this bushing. A bearing plate 150 is secured to the housing 24 by screws 152, the hub of the bearing plate having press fitted therein the bearing bushing 154. The sun gear 146 and the hub of the bearing plate 150 are end splined together at 156 whereby the sun gear is positively held against rotation at all times.

The planet pinion carrier of the transmission gear set comprises a front bearing member 158 provided with a bearing bushing 160 and a rear bearing member 162 provided with a bearing bushing 164. Planet pinion bearings 166 hold the carrier bearing members axially spaced apart, and the bolts 168 and nuts 170 extending through the carrier bearing members and the pinion bearings hold the carrier parts together.

Planet pinions 172 having bearing bushings 174 are rotatable on the bearings 166, the pinions being in constant mesh with the sun gear 146

The ring gear 176 is in constant mesh with the planet pinions 172. Its front bearing member 178 and its rear bearing member 180 are secured to the ring gear by bolts 182 and nuts 184. The front bearing member 178 is provided with a bearing bushing 186 and the rear bearing member 180 with a bearing bushing 188. These bearing bushings enable the ring gear to rotate in concentric relation with the sun gear, but carry no radial load except the weight of the several parts.

The output member 76 of the transmission gear set has a rearwardly extending hub 190 rotatable in the ball bearing 192, held in the partition 26, the front end being closed by the bearing head 194 secured in place by the screws 196. The bearing head 194 is provided with a bearing bushing 198. An end thrust washer 195 limits axial movement.

For convenience in further description, the ring gear 176, its bearing heads 178 and 180, its bolts 182, and nuts 184 and its bearing bushings 186 and 188 may be called the ring gear element and may be broadly designated as such by the numeral 200. End thrust washers 197 and 199 limit axial movement of the ring gear element. For the same reason, the planet pinion carrier front bearing member 158 and rear bearing member 162 with their bearing bushings 160 and 164, and the planet pinion bearings 166 with their bolts 168 and nuts 170 may be called the carrier element, and as such may be broadly designated by the numeral 202. End thrust washers 201 and 203 limit axial movement of the carrier element.

Obviously, with the sun gear 146 permanently held from rotating by the end splines 156 as hereinbefore described, if the ring gear element 200 is rotated, the carrier element 202 will rotate in the same direction but at less speed, and if the carrier element is rotated, the ring gear element will rotate in the same direction but at greater speed. The ring gear element will under all conditions, rotate faster than the carrier element.

It follows that, if the input member of the transmission gear set is connected to the ring gear element, and the output member to the carrier element, an underdrive ratio will be provided wherein the output member will rotate more slowly than the input member.

Conversely, if the input member is connected to the carrier element, and the output member to the ring gear element, an overdrive ratio will be provided wherein the output member will rotate faster than the input member.

On the other hand, if both the input member and the output member are connected at the same time to the same element, a direct drive will be provided wherein the input member and the output member revolve at the same speed. Both members in this case may preferably be connected to the ring gear element for then the carrier element merely rotates idly at sub-engine speed as does the countershaft of a conventional syncromesh transmission during direct drive.

Of course, a direct drive may be had by connecting the input member and the output member both at the same time to the carrier element, but in that case the ring gear element will rotate idly at super engine speed, which is less desirable.

It will now be apparent that, with the single planetary gear train, arranged as shown, an underdrive ratio, a direct drive ratio, and an overdrive ratio may be had by providing the input and the output members each with a clutch which will, each at its own proper time, take hold of one of the rotating elements, i. e., ring gear element or carrier element, and let go of the other.

Accordingly, two clutches are provided. The clutch on the output member has one pair of pawls normally engaging the carrier element and a second pair of normally idle pawls which may become operative above a predetermined speed to first engage the ring gear element then release the first pair of pawls from the carrier element. The clutch on the input member has one pair of pawls normally engaging the ring gear element and another pair of normally idle pawls which may become operative above a higher predetermined speed to first engage the carrier element then release the one pair of pawls from the ring gear element.

The clutch which is carried by the output member, and which functions to shift from an underdrive ratio to a direct drive ratio, may be for greater convenience in further description be called the direct drive clutch and may be broadly designated by the numeral 204. The other clutch which is carried by the input member, and which functions to shift from a direct drive ratio to an overdrive ratio, may for a like reason be called the overdrive clutch and may be broadly designated by the numeral 206.

To facilitate description of the assembled views, the parts which cooperate to clutch the carrier element will be provided with the sub-letter "c" and those which cooperate to clutch the ring gear element will have the sub-letter "r."

The means provided on the ring gear element for the direct drive clutch 204 to engage, comprises a rib 208 formed integrally on the inside of the ring gear bearing member 178 (see Fig. 1) having two opposite notches 210r (see Fig. 8) and two spiral curves 212r connecting the edges of one notch to the edges of the other. The two spirals 212r comprise a two toothed ratchet which for convenience in further description may be termed the ring gear ratchet 212r. The means provided on the carrier element for this same clutch 204 to engage comprises a dish shaped rim 214 extending from the carrier bearing member 158 (see Fig. 1) having two opposite notches 216c (see Fig. 10) and two spiral curves 218c connecting the edges of one notch to the edges of the other. The two spirals 218c comprise a two toothed ratchet which may be called the carrier ratchet 218c.

The means provided on the ring gear element for the overdrive clutch 206 to engage, comprises a rib 220 formed integrally with the ring gear bearing member 180 (see Fig. 1) having two opposite notches 222r (see Fig. 14) and two spiral curves 224r connecting the edges of one notch to the edges of the other. The two spirals 224r comprise a two toothed ratchet which may be called the ring gear ratchet 224r. The means provided on the carrier element for the same clutch 206 to engage, comprises a dish shaped rim 226 extending from the carrier bearing member 162 (see Fig. 1) having two opposite notches 228c (see Fig. 14) and two spiral curves 230c connecting the edges of one notch to the edges of the other. The two spirals 230c comprise a two toothed ratchet which may be called the carrier ratchet 230c.

For the direct drive clutch 204 there is provided a frame 232, shown in detail perspective in Fig. 5. Frame 232 has a hub 234 with end splines 236 which enter spaces between corresponding end splines in the rear end of the hub of the output member bearing head 194 (see Fig. 1). The clutch frame 232, therefore must always rotate in unison with the output member 76.

At the rear end of the hub 234 is a disc 238 which has extending therefrom a series of guide lugs 240 and 242 and a pair of spring lugs 244. The hub 234, disc 238, lugs 240, 242, and 244 are preferably integral.

Radially slidable between each pair of lugs 242 is a centrifugally operative weight 246, shown in detail perspective in Fig. 6. Each weight comprises a body part 248 just wide enough to slide freely between the lugs 242 and exactly as thick as the lugs are high. The lips 250 act as stops to limit radially outward movement of the weights when the lips engage the inner edges of the lugs 242 (see Fig. 8). At the outer edge the body of the weight is thinner as at 252 so that this part of the weight may extend between the rib 208 and the rim 214 when the weights are moved radially outward by centrifugal force. A central opening 254 contains the spring 256 which reacts against the lug 244 to hold the weight to its inner position. One side of the body 248 is notched as at 258 to provide a place for the lug 244 to enter when the weight moves out.

Each weight 246 has integrally depending therefrom a pawl control arm 260 (see Figs. 6 and 9) having two spring plunger lugs 262 and 264 and two pawl operating lugs 266 and 268.

The lugs 262 and 264 are bored at 270 and 272 to slidably receive the spring plungers 274 and 276 (see Fig. 9). The plungers 274 and 276 have flanges 278 and 280 which are held against the lugs by a pawl shifting spring 282. Each arm 260 has a slot 284 through it, and a ring 286, freely rotatable on the clutch frame hub 234, has ears 288 extending into the slots. The ring 286 is not as wide as the weights are thick, the weights being grooved on their inner faces to receive the ring when the weights are in their inner or home position. This weight and ring arrangement prevents one weight 246 being moved outwardly by centrifugal force ahead of the other, thereby preventing an unbalanced condition which would exist should one weight be momentarily out while the other is still in.

Four pawls 290, shown in detail perspective in Fig. 7, are freely slidable in the clutch frame 232 between lugs 240 and 242. Since the pawls which clutch the carrier element and those which clutch the ring gear element are exact duplicates, the sub-letters "c" and "r" are not applied in the detail view Fig. 7. A pawl adapted to clutch one of the elements is merely turned upside down with respect to the other to adapt it to clutch the other element. Referring to Fig. 7, each pawl comprises a body part 292 having three lugs 294, 296, and 298 integral. The lugs 298 have holes 300 (not shown in Fig. 7) in the one side for a small spring 302. The working end only of each pawl, that is, the end 304 is narrowed to fit the notches 210r and 216c. The other end is merely rounded to clear the parts surrounding it.

In the assembly of the direct drive clutch 204 (see Figs. 10 and 13), the two pawls 290 which are adapted to engage the carrier element appear closest to the observer with the plain sides of their bodies 292 upward between pairs of lugs 240 and 242, the lugs 294c, 296c and 298 extending downward. The other pair of pawls 290 have their bodies 292 farthest from the observer and the lugs 294r, 296r, and 298 extending upward, the ends of the lugs of one pawl touching the body of the other, thereby leaving space between the pawls for the pawl control arm 260 of the weight. The springs 256 and 282 and the plungers 274 and 276 and the ring 286 are preferable assembled with the weights and the pawls laid on opposite sides of the control arms and the whole entered into the clutch frame. The small springs 302 may then be inserted in the holes 300 of the lugs 298 whereupon the clutch will be ready to slide over the hub of the sun gear 146. It will be observed that when a pair of pawls is assembled in the frame 232 with their lugs extending toward each other as described (see Fig. 13) their combined thickness will be the same as the height of the lugs 240 and 242 on the frame. Also, the height of the lugs 294 and 296 on the pawls (see Fig. 7) is the same as the thickness of the control arm 260 of the weight. Further, the thickness of the body 292 of two pawls plus the thickness of the control arm 260 equals the height of the frame lugs 240, 242, which is equal to the thickness of the weight body 248.

The control arm 260 is therefore always slidable between two pawls by the weights, whereby the control arm may positively move either of the two pawls to some extent by the operating lugs 266c or 268r acting against the pawl lugs 294c or 294r, and may resiliently move either of the two pawls to a greater extent by the spring plungers 274 and 276 acting against the pawl lugs 296r and 296c.

The overdrive clutch 206 is substantially like the direct drive clutch 204 just described, except that it is required to be modified to include a resilient detent mechanism which helps to hold the weights at their "in" position when they are in and helps to hold them at their "out" position when they are out. The reason why such a detent mechanism is required to control the weights when they are being revolved by the input member and are not required when being revolved by the output member will appear when the operation of the mechanism is hereinafter described. Since this clutch becomes operative at a much higher speed than the direct drive clutch, the weights are lighter and the springs stronger.

The transverse section Fig. 14 best shows the modifications in the overdrive clutch. The clutch frame has a hub 305 internally splined to fit over the external splines 307 of the input shaft 70. The disc 309 carries a series of lugs as before. The four lugs 240 and two of the lugs 242 are the same as in the direct drive clutch. The other two lugs 306 are made thicker and are drilled for the detent springs 308 and balls 310. The body 311 of the weight is of such width as to be received slidably between a lug 306 and a lug 242, one edge of the body having two pockets 312 and 314 to receive the ball 310, the first for the "in" position of the weights and the other for the "out" position.

A spring 316 in a pocket 318 and reacting against a lug 319 on the clutch frame, holds the weights to the "in" position. The plungers 274 and 276 are identical with those in the direct drive clutch. The springs 321 are of heavier wire than those of the direct drive clutch but the springs 302 are identical. The remaining parts of the overdrive clutch 206 are substantially the same both in construction and operation as the direct drive clutch 204. It should be noted, however, that the two carrier bearing members 158 and 162 face in opposite axial directions, and therefore, in order that their spiral curves 218c and 230c may be the same relative to the direction of running, the spirals must be of opposite "hand" when the two carrier bearing members are unassembled and with their flanges facing in the same direction. The same applies to the two ring gear bearing members 178 and 180. Their spirals 212r and 224r are alike in "hand" when assembled as shown but opposite when the members are unassembled and their open ends facing in the same direction.

As a further difference, the four pawls 290, Fig. 7, when adapted for the overdrive clutch must have all lugs extending downwardly from the body instead of upwardly as shown in Fig. 7. This is a requirement because, in the direct drive clutch 204, the notches drive the pawls, and in the overdrive clutch, the pawls drive the notches. Furthermore, the direct drive clutch normally engages the carrier but shifts to engage the ring gear, while the overdrive clutch normally engages the ring gear but shifts to engage the carrier.

The long hub 190 of the output member 76 extends rearwardly into the reversing gear compartment. The reversing sun gear 320 has internal splines 322 which fit corresponding splines on the hub. The tail shaft 324 is rotatably supported at the rear end by the ball bearing 326 held in the bearing head 32, and at the front end by the bearing bushing 328 which is press fitted in the rear end of the hub. The larger diameter of the tail shaft 324 abuts the rear end of the sun gear 320 and therefore prevents the sun gear moving axially.

The ball bearing is held on the tail shaft by the screw 330 acting through intermediate parts 332 and 334. The ring gear 336 is shown integral with the tail shaft 324 but may be made separately and permanently secured thereto.

The reversing planet pinion carrier 338 is provided interiorly with the bearing bushing 340 within which the hub of the sun gear 320 may rotate. Integral hollow studs 342 extend rearwardly to rotatably support the planet pinions 344 in constant mesh with both the sun gear 320 and ring gear 336. The pinions 344 are provided with bearing bushings 346 which are rotatable on the studs 342. A carrier rear bearing member 348 is held to the carrier 338 by the bolts 350. A bearing bushing 352 is press fitted into the member 348 and the tail shaft 324 is rotatable in the bushing.

Near the forward end, the carrier 338 is grooved for the shifting collar 354. At the extreme forward end, the carrier has external teeth 356 adapted to fit slidably into the internal teeth of the plate 358, the plate 358 being secured to the partition 26 by the rivets 360. The carrier has also the internal teeth 362 adapted to fit slidably over the teeth of the sun gear 320.

A forward and reverse shifting fork 364 (see Fig. 15) has two studs 365 extending radially into openings in the shifting collar 354. One side of fork 364 is swingable on the bearing stud 366 which is screwed into the hub 368 in the housing 24. A bushing 370 is press fitted into the fork and runningly fitted over the stud 366. The other side of the fork is internally splined at 372 for the external splines of the reversing lever 374, which is rotatable in the hub 376 of the housing 24.

A beveled valve like seat 377 in the outer end of the hub 376 and a correspondingly beveled shoulder on the reversing lever 374 is intended to prevent leakage of lubricant from the housing. A detent bracket 378 is held to the housing 24 by screws 380. A detent ball 382 is pressed by a detent spring 384 into a seat 386 suitably positioned for forward, neutral and reverse positions of the lever 374. A spring 388 keeps the beveled shoulder of the lever 374 against the beveled seat 377.

The lower end of the lever 374 is provided with a hub 390 to which any suitable operating means may be attached and extended to a position convenient for the operator.

The reversing mechanism just described is shown in my copending application Serial No. 180,174, filed Dec. 16, 1937, and is included herein only to provide a complete operative mechanism.

The modification shown in Fig. 18 is intended to be used where a non free wheeling underdrive gear set only is desired having a single centrifugal clutch to shift from underdrive to direct drive at a predetermined speed. In this modification, the overdrive clutch 206 used in Fig. 1 is eliminated, and the direct drive clutch 204 is retained with parts exactly as in Fig. 1.

The modification Fig. 18 comprises a housing 24a with an end bearing head 150a held on by screws 152. The head 150a has a bearing bushing 154 for the input shaft 70a, a second bushing 74a in the hub 190a of the output member 76a providing rotative bearing for the rear end of the shaft.

The output member 76a is rotatable at the rear end in the ball bearing 192 held in the housing 24a, and at the front end on a bearing bushing 198 in the end head 194a which is held on by screws 196. The ring gear bearing member 180a is held to the ring gear 176a by screws 184a. Bearing member 180a has internal splines 392 fitting over external splines on the shaft 70a. The modified carrier bearing member 162a has a bearing bushing 164 rotatable on the hub of the member 180a. The parts of Fig. 18 which have been assigned numerals with the sub-letter "a" bear slight modification from similar parts of Fig. 1, the remaining parts being identical therewith both in structure and function. Sections taken at 8a—8a, 9a—9a, and 10a—10a are represented by Figs. 8, 9, and 10, respectively. It will be seen that the ring gear bearing member 180a, instead of being connectable by a clutch to the input shaft, is, in the modification connected permanently to the input shaft by the splines 392.

The modification shown in Fig. 19 is intended to be used as an automatic non free wheeling overdrive gear set and may be used in conjunction with any kind of transmission gear set, preferably attached to the rear end thereof. In this modification, the direct drive clutch 204 used in Fig. 1 is eliminated, and the overdrive clutch 206 is retained with parts exactly as in Fig. 1.

The modification Fig. 19 comprises a housing 24b with an end bearing head 150b held on by screws 152. The head 150b has a bearing bushing 154b for the input shaft 70b, a second bushing 74b in the hub of the sun gear bearing member 180b providing rotative bearing for the rear end of the shaft.

In this modification the ring gear bearing member 180b is also the output member, the ring gear 176b being secured thereto by the screws 184b. The output member 180b is rotatably supported at the rear end by the ball bearing 192 but has no front bearing, depending rather on the long bearing 74b to maintain its coaxial relation. The modified carrier front bearing member 158b has a bearing bushing 160. The sun gear 146b has a shorter hub and consequently a shorter bearing bushing 148b. The hub 305b of the clutch frame 309 is slightly modified but is drivably secured to the shaft 70b by the splines 307b. The parts of Fig. 19 which have been assigned numerals with the sub-letter "b" bear slight modification from similar parts of Fig. 1, the remaining parts being identical therewith both in structure and function. A section taken at 14b—14b is represented by Fig. 14. It will be seen that the ring gear bearing member 180b instead of being connectable by clutch to the output member is in this modification one and the same unit.

*Proportion*

While the structure shown may be proportioned for use with any horsepower and vehicle weight within reason, some suggestion as to proportion for a given vehicle may preferably be given.

If the largest diameter of the housing 22 is taken as 15½ inches and the other parts are made to the same scale, the mechanism will be suitable for an engine of around 110 H. P. in a vehicle of approximately 3600 pounds weight.

The transmission gearing is 14 pitch 14 degree pressure angle and 14 degree right hand helix angle. The ring gear has 57 teeth on a pitch diameter of 4.196 inches; the sun gear 27 teeth on a pitch diameter of 1.988 inches; and the planet pinions 15 teeth on a pitch diameter of 1.104 inches.

The underdrive ratio provided by making the ring gear the driver, the planet pinion carrier the driven, and the sun gear the reaction member, will then be $$\frac{R+S}{R} = \frac{57+27}{57} = 1.474 \text{ input revolutions}$$

to 1 output revolution.

The overdrive ratio, provided by making the planet pinion carrier the driver, the ring gear the driven, and the sun gear the reaction member, will then be $$\frac{R}{R+S} = \frac{57}{57+27} = 0.6784 \text{ input revolution}$$

to 1 output revolution.

In the reversing gearing where quiet operation and long wear is not the prime consideration a stub tooth design is preferable for strength. The gearing is 12-14 stub tooth, 20 degree pressure angle and straight spur teeth. The ring gear has 54 teeth on a pitch diameter of 4.50 inches; the sun gear 24 teeth on a pitch diameter of 2.00 inches; and the planet pinions 15 teeth on a pitch diameter of 1.25 inches.

The reverse ratio provided by making the sun gear the driver, the ring gear the driven, and holding the planet pinion carrier non rotative is then $$\frac{R}{S}=\frac{54}{24}=2.25 \text{ input revolutions}$$

forwardly to 1 output revolution backwardly.

By using a 4⅓ to 1 rear axle, the engine-to-wheel ratio through underdrive will be 6.39 to 1; through direct 4.33 to 1; through overdrive 2.94 to 1; and through reverse 9.75 to 1. These engine to wheel ratios are those effective when the hydraulic unit is operating at 1 to 1 ratio.

When the ratio through the hydraulic unit is changed, by application of heavy engine power against considerable vehicle resistance to as much as say 2 input to 1 output revolution, the engine-to-wheel ratio through underdrive will of course be 2×6.39=12.78 to 1, which corresponds substantially to low gear ratio of common practice.

The spring 86 should be made of .162 inch round wire, coiled 2 inch pitch diameter, have six active coils and a free length of 6.81 inches. Its stress when in the position shown in the drawing will then be 100 pounds, and with the centrifugal valve operating weights 102 proportioned as shown in the drawing they will swing outwardly at 500 engine R. P. M.

The spring 256 should be of .054 inch round wire coiled ½ inch pitch diameter, have 12 coils and a free length of 3.182 inches. The spring 316 should be of .072 inch round wire coiled ⅝ inch pitch diameter, have nine coils and a free length of 2.863 inches. The spring 282 should be of .032 inch round wire coiled ⅜ inch pitch diameter, have 20 coils and a free length of 3.875 inches. The spring 321 should be of .041 inch round wire, coiled ⅜ inch pitch diameter, have 18 coils and a free length of 2.854 inches. The spring 308 should be of .041 inch round wire, coiled ¼ inch pitch diameter, have 10 coils and a free length of 1.068 inches. The spring 302 should be made of .020 inch round wire coiled to ⅛ inch pitch diameter, and cut to such length as will, by trial, give about two pounds pressure when in place. Other proportions may be obtained by scaling the drawings.

*Operation*

The normal condition of the mechanism, that is, the condition which exists when the engine is at rest or is idling below 500 R. P. M. is that which is shown in the drawings, where the centrifugal weights 102 of the hydraulic unit are in their "in" position, the impeller valves 96 are closed, the rotor brake 82 is applied, the transmission gear set is coupled for underdrive and the reversing gear set is in neutral. In this condition, the engine may be speeded up and warmed if desired.

To set the reversing gear set for moving the vehicle backwardly, the hub 390 of the reversing lever 374 is moved rearwardly, which draws the carrier 338 forwardly and engages the carrier clutch teeth 356 with the internal teeth of the clutch plate 358. When the carrier 338 is thus held non-rotative, forward rotation of the sun gear 320 will cause rearward rotation of the ring gear 336 and the vehicle will move backwardly.

For all forward driving, the hub 390 of the reversing lever 374 is drawn forwardly, which pushes the carrier 338 rearwardly until the internal clutch teeth 362 slide over the teeth of the sun gear 320. The teeth of the planet pinions 344, being still meshed one third their length into the teeth of both the sun gear 320 and the ring gear 336, a locked up condition is provided wherein the tail shaft 324 must rotate in unison with the transmission output member 76.

If the engine is now speeded up past 500 R. P. M., the centrifugal weights 102 will swing out against the stops 128, open the valves 96, rotate the gear 114 which will draw the collar 118 forwardly, which will move the rotor brake 82 to the fully disengaged position.

If the power now applied is considerable in proportion to the vehicle resistance, the stator 66 will attempt to rotate rearwardly but will be arrested by the roller brake 134, whereupon the impeller 46 will drive the rotor 52 at reduced speed and increased torque.

The rotor shaft 70 which will always rotate forwardly at rotor speed, drives the ring gear element 200 of the transmission gear set forwardly by the pawl ends 304r (see Fig. 14) which are normally in the notches 222r of the rib 220 (see Fig. 1), the pawl ends 304r being driven by the clutch frame 309 which is splined on the rotor shaft. Since the sun gear 146 is permanently fixed against rotation, the carrier element 202 will rotate forwardly at less speed than the ring gear element, the ring gear element revolving 1.474 turns to one turn of the carrier element.

The carrier element 202 drives the output member 76 by the carrier notches 216c (see Fig. 10) cut in the carrier rim 214 (see Fig. 1) which are normally over the pawl ends 304c, the pawls being held in the clutch frame 232 which is end splined at 236 to the output member head 194. Obviously, the input member normally revolves 1.474 turns to 1 turn of the output member, the pawl and notch drive being such that there is no overrunning. For engine braking when descending steep hills, the normal connections described produce a ratio which is equivalent to second gear of common practice.

At 18 M. P. H. the weights 246 have generated enough centrifugal force to start moving outwardly and do in fact move half way out at this speed, so that the pawl operating lugs 266c encounter the pawl lugs 294c, whereupon the weights stop when half way out because they can not pull the carrier pawl ends 304c out of the notches 216c against the frictional resistance between the pawl and notch caused by the pressure due to the torque load being carried. If, however, the operator inadvertently or purposely momentarily releases the applied power to lessen the pressure between the pawl ends and the slots, the weights will move the other half of the way out, and in doing so, the lugs 266c, acting against the carrier pawl lug 294c will draw the carrier pawl ends 304c half of their ultimate travel toward disengaged position, that is, when the weights move the second half of the weight travel they move the pawl ends 304c the first half of the pawl travel.

The ring gear pawl ends 304r are now urged toward engaged position in the notches 210r by the now compressed springs 282, acting against the plungers 274, which in turn act against the ring gear pawl lugs 296r. The ring gear pawl may move only half of its ultimate travel because the ring gear lug 296r has caught up to the carrier lug 294c which itself has moved only half the total travel. The result is that both the carrier pawls and ring gear pawls are now located with their heels out of their respective notches but not their toes, so that instead of the carrier pawls being engaged with a positive two way drive, both the carrier pawls and the ring gear pawls are engaged with a one way ratchet drive.

At the instant this one way ratchet drive begins, the ring gear is rotating 1.474 turns to 1 of the carrier which is, of course, 1.474 turns of the two tooth ratchet $212_r$, to 1 turn of the pawl ends $304_r$ which are spring pressed against the ratchet as it rotates. During this transition period wherein the outpost member is disconnected from the carrier element and ultimately connected to the ring gear element, this double ratchet drive allows the output member to rotate at any speed between that of the ring gear and that of the carrier. It may not, however, rotate faster than the ring gear nor slower than the carrier. It follows that, if the engine power is reapplied too soon, that is, when the ratcheting has just begun, the carrier catches up to the output member and drives it with a one way ratchet drive, whereas before the shift started it drove it with a two way drive. If, however, after ratcheting begins, the operator waits one or two seconds until the drop in engine speed slows the ring gear down to that speed which the carrier had before, the ring gear pawl ends $304_r$ will drop into the ring gear notches $210_r$ and the shift from underdrive to direct drive will be completed.

When the ends $304_r$ of the ring gear pawl thus drop into the notches $210_r$, the ring gear lugs $294_r$ necessarily act against the carrier lugs $296_c$ and the carrier pawl ends $304_c$ are drawn completely from their half out ratcheting positions to fully disengaged positions. In short, the lugs 294 and 296 of Fig. 7 are so placed that the carrier and ring gear pawls may never both be even slightly entered in their notches for positive drive at the same time. To enable one pawl to start in its positive drive notch, the other must be out.

Fig. 11 shows the direct drive clutch 204 in the transition period. During this period, the clutch frame and pawls, being secured to the output member, maintain a constant speed due to vehicle momentum. As the engine speed falls, the ring gear ratchet $212_r$ rotating faster than the ring gear pawls $304_r$ ratchets over them, while the carrier ratchet $218_c$ rotating slower than the carrier pawls $304_c$ ratchets over them. Fig. 11 shows both pairs of pawls just about to pass over the highest points of their respective ratchet teeth, a condition which is bound to occur at some time during the transition period while the carrier is dropping from the output member speed to a lower speed and the ring gear is dropping from a higher speed to the output member speed.

During the condition appearing in Fig. 11, the small springs 302 are stressed the maximum. These springs always urge a carrier pawl and a ring gear pawl apart until they are stopped by a lug $296_c$ abutting a lug $294_r$, that is, the position shown in Fig. 13, whereupon the chordal measurement across the pawls is just enough to prevent both pawls entering a positive drive notch at one and the same time. The small spring 302 is, however, only concerned with spreading the pawl ends $304_c$ and $304_r$ apart. It is not concerned with which direction, with respect to the ratchets, they go.

Because the weights are now in the "out" position, the heavier shifting springs 282 are also at the maximum stressed condition and these springs are acting only against the plungers 274 and lugs $296_r$. Their full pressure is therefore being exerted to force the pawl ends $304_r$ into the notches $210_r$.

They will do so as soon as the ring gear drops to the output member speed, at which time the notches $210_r$ and pawl ends $304_r$ are synchronized. The lugs $294_r$ and $296_r$ on the ring gear pawl (see Fig. 13) will act against the lugs $294_c$ and $296_c$ of the carrier pawl, whereby entrance of the end $304_r$ of the ring gear pawl into the positive drive notch $210_r$ may not take place until the end $304_c$ of the carrier pawl is drawn far enough out of its notch $216_c$ to break its positive drive.

When the shift from underdrive to direct drive is completed as above explained, the direct drive clutch 204 will appear as in Fig. 12, where the weights are still being held clear out by centrifugal force, against the stress of the main springs 256. The shift from carrier pawl engagement to ring gear pawl engagement has relieved the stress of the shifting springs 282 as well as the small springs 302.

Now in order that the weights could move out, they had to stress both the main springs 256 and the shifting springs 282 which required a centrifugal force of about 32 pounds+8 pounds=40 pounds. After, the weights are out, the main springs are shorter and their stress is increased to 36 pounds, but the shifting of the pawls has relieved the centrifugal force from having to stress the shifting springs. Now when the main spring move the weights back in, they must not only overcome the centrifugal force but must restress the shifting springs. It follows that the centrifugal force of the weights must be 32+8=40 pounds before they move out, and be reduced to 36—8=28 pounds before they will move back in.

By calculation it will be seen that, although the weights will move out at 18 m. p. h., they will not move back in until the vehicle speed has fallen to 14 m. p. h. This overlap is necessary to prevent too frequent shifts should the operator be maintaining an almost constant vehicle speed approximately the shifting speed.

As long as the direct drive clutch 204 remains in the condition shown in Fig. 12, the output member will be connected to the ring gear element, and, since the input member is normally connected to the ring gear element, a direct drive ratio is in effect, wherein both input and output members are connected to the ring gear and the carrier is connected to neither but merely rotating idly at less than engine speed.

After a speed of 38 m. p. h. is exceeded in direct drive, the overdrive clutch 206, shown in its normal condition in Fig. 14 may be shifted up in the same manner as explained relative to the direct drive clutch 204. The clutch frame 309 is rotated by the input member and the ring gear pawls $304_r$ are normally in ring gear notches $222_r$, but, upon shift up, the carrier pawls $304_c$ will enter the notches $228_c$. The same ratcheting will take place in the transition period.

There is, however, a difference between the operation of the direct drive clutch 204 and the overdrive clutch 206, in that, during the transition period of the direct drive clutch 204, the weights, being rotated by vehicle momentum do not lose any substantial speed, while during the transition period of the overdrive clutch, the weights, being rotated by the input member at engine speed will lose about 33% of their speed as the engine speed is let down that amount to cause the shift.

When the weights lose 33% of their speed, they lose 57% of their centrifugal force, since the force is in proportion to the square of the speed. It follows that some provision must be made to assist the centrifugal force which is left after the shift to hold the weights out, otherwise the instant the transition period was complete the weights would move back in. This assistance is provided by the detent mechanism comprising the spring 308 and ball 310 together with the pocket 312.

At 38 m. p. h., the weights 311, Fig. 14, generate 96 pounds outward force. This will overcome the main springs 316 having 60 pounds resistance, compress the shifting springs 321 having 16 pounds resistance plus 20 pounds resistance offered by the detent mechanism 308, 310, 312. When the weights move out, the stress of the main springs 316 increases from 60 pounds to 70 pounds. After the shift up, in order to shift back down, the main springs 70 pounds must compress the shifting springs, 16 pounds, overcome the detent mechanism, 20 pounds, which leaves only 70—36=34 pounds which must be sustained by the centrifugal force, that is, it takes 96 pounds centrifugal force to force the weights out, but only 34 pounds centrifugal force to hold them out after they are out.

By calculation it may be found that with the overdrive clutch 206 engaged, the vehicle speed must still be reduced as low as 30 m. p. h. before a shift down from overdrive to direct will take place. This overlap of 8 m. p. h. is adequate to prevent too frequent shifting.

The underdrive, direct drive, and overdrive ratios, automatically provided by the transmission gear just described, will substantially correspond to second, high, and overdrive of conventional automotive practice, but it must be remembered that the hydraulic torque converter is always in series with one or the other of the transmission ratios, so that, upon application of considerable engine power, more suddenly than vehicle weight allows the vehicle to respond, will convert second into low, high into second, or overdrive into high, at least momentarily or until the need for power at the expense of speed has been satisfied.

The ratios between low and overdrive will be substantially those now in use but instead of being taken in several steps will change by infinitesmal increment, for when the transmission gear is in second and heavy enough power applied to pull the torque converter to its lower range to provide low gear, the change in ratio as the resistance diminishes will be gradual, until, when the torque converter gets back to its one to one ratio, the change will have been made gradually between low and second.

If now the speed is past 18 m. p h. and a momentary release in driving strain occurs, and the transmission shift-up to high takes place, and thereafter heavy enough power is applied to pull the torque converter to its lower range, thereby providing second gear, the change in ratio as the resistance diminishes will also be gradual, until, when the torque converter again gets back to its one to one ratio, the change will have been made gradually between second and high.

The same gradual change takes place in the same manner between high and overdrive.

It is not intended that the operator of a vehicle having the herein described transmission mechanism must necessarily pay any attention to the ratio in effect, because in normal driving, the power application is quite frequently varied unconsciously to an extent sufficient to cause the vehicle to drive the engine for an instant, and whenever this occurs, if the transmission gear set is not connected for the most desirable ratio, the change to the most desirable ratio will take place without the operator's knowledge. Intermediate the time of the changes in the gearing the hydraulic unit will operate to increase or reduce the overall ratio as speed and load conditions require.

Thus, any time and with any transmission gear ratio effective, a reduction in ratio may be had through the hydraulic unit by the application of heavy power against heavy vehicle resistance if the engine speed has not at that time reached a value which is too near its maximum, in which case the engine could not increase its speed sufficiently to drive the vehicle at the then existing speed through any lower ratio.

Engine braking will always be in second gear if the speed is below 18 m. p. h., in high gear if the speed is below 38 m. p. h., and in overdrive if the speed is above 38 m. p. h.

The operation of the modifications Figs. 18 and 19 will be substantially like the operation of the direct drive clutch 204 and the overdrive clutch 206 described relative to Figs. 1 to 17 and need not be further described.

It will be understood, however, that either mechanism Fig. 18 or Fig. 19 may be readily adapted to overdrive service or underdrive service by using the output member for an input member and the input member for an output member. In such adaptation, the detent mechanism shown should always be used if the clutch weights are being revolved by the input member.

The scope of the invention is further defined in the following claims.

I claim:

1. Transmission mechanism comprising, a housing, a driving member and a driven member rotatably supported in the housing, a sun gear permanently secured to the housing against rotation, a ring gear rotatable coaxially with the sun gear, planet pinions rotatably in mesh with the sun gear and the ring gear, a planet pinion carrier, a clutch mechanism operative at low speed to positively secure the driven member to the carrier in two way driving relation, but operable above a predetermined increase in speed to release the driven member from the carrier and connect it to the ring gear in two way driving relation, a second clutch mechanism operative at moderate speed to positively secure the driving member to the ring gear in two way driving relation but operable at a higher predetermined increase in speed to release the driving member from the ring gear and connect it to the carrier in two way driving relation, ratchet means in the first said clutch mechanism whereby, during the transition period between its two said two way driving connections, the driven member is overrunningly connected to rotate slower but not faster than the ring gear and faster but not slower than the carrier, and ratchet means in the second said clutch mechanism whereby during the transition period between its two said two way driving connections, the driving member is overrunningly connected to rotate faster but not slower than the carrier and slower but not faster than the ring gear.

2. Transmission mechanism comprising, a housing, a driving member and a driven member rotatably supported in said housing, a sun gear permanently secured against rotation within said housing, a rotatable ring gear coaxial with said sun gear, rotatable planet pinions in mesh with said sun gear and ring gear, a planet pinion carrier, a clutch mechanism normally operative to positively hold the driven member connected in two way driving relation with the carrier, but operable above a predetermined speed to release said driven member from said carrier and connect it in two way driving relation to the ring gear, overrunning means in said clutch mechanism whereby, during the change from one connection to the other, the driven member may rotate slower but not faster than the ring gear and faster but not slower than the carrier, a second clutch mechanism normally operative to positively hold the driving member connected in two way driving relation with the ring gear, but operable above a predetermined speed to release said driving member from said ring gear and connect it in two way driving relation to the carrier, and overrunning means in the second said clutch mechanism whereby, during the change from one connection to the other, the driving member may rotate faster but not slower than the carrier and slower but not faster than the ring gear.

3. Transmission mechanism comprising, a driving member, a driven member, a sun gear fixed against rotation, a rotatably mounted coaxial ring gear, a planet pinion carrier, planet pinions on said carrier in mesh with both the sun gear and the ring gear, whereby said ring gear always rotates faster than said carrier, a clutch mechanism on the driving member normally maintaining a two way driving connection with the ring gear but operable at a predetermined speed to release said connection and make a two way driving connection with the carrier, a second clutch mechanism on the driven member normally maintaining a two way driving connection with the carrier but operable at a lower predetermined speed to release said connection and make a two way driving connection with the ring gear, and means in said clutches operative during the transition period from one connection to the other, to restrict rotation of said driving and driven members to speeds between the speed of the ring gear and the speed of the carrier.

4. Transmission mechanism comprising, an input member, an output member, a sun gear fixed against rotation, a coaxial ring gear element, a planet pinion carrier element, planet pinions on said carrier element in mesh with both the sun gear and the ring gear, whereby said ring gear element always rotates faster than said carrier element, two clutchable means on each of said elements, a separate clutch mechanism on each of said members, each normally clutching the clutchable means on one of said elements with a two way driving connection but adapted above a predetermined speed to release the clutchable means on said one element and engage the clutchable means of the other element with a two way driving connection, and means in said clutch mechanisms whereby, during the transition period, the speeds of the members may not be slower than the carrier nor faster than the ring gear.

5. Transmission mechanism comprising, an input member, an output member, a sun gear fixed against rotation, a coaxial ring gear element, a planet pinion carrier element, planet pinions on said carrier element in mesh with both said gears, whereby said ring gear element always rotates faster than said carrier element, two separate clutch mechanisms one on each of the said members so arranged that each clutch mechanism normally clutches one of said elements with a two way driving connection but is adapted above a predetermined speed to release said one element and clutch the other element with a two way driving connection, and adapted, in the transition period, to clutch both elements with a one way driving connection.

6. Transmission mechanism comprising, an input member, an output member, a sun gear fixed against rotation, a coaxial ring gear element, a planet pinion carrier element, planet pinions on said carrier element in mesh with both gears, whereby said ring gear element always rotates faster than the carrier element, and clutch mechanisms associated with said members one adapted at a low speed to maintain connection of the input member and the ring gear element a second maintaining connection of the output member and the carrier element, and at a higher speed both maintaining connection of their respective members with the ring gear element, and at a still higher speed the one maintaining connection of the input member with the carrier element and the second maintaining connection of the output member with the ring gear element.

7. Transmission mechanism comprising, an input member, in an output member, a sun gear fixed against rotation, a coaxial ring gear element, a planet pinion carrier element, planet pinions on said carrier element in mesh with both said gears, whereby said ring gear element always rotates faster than the carrier element, and clutch mechanisms associated with said members one adapted at one speed to maintain connection of one of said members with one element the second maintaining connection of the other member with the other element, and at a higher speed said mechanism being adapted to maintain connection of both members with the ring gear element, and at a still higher speed adapted to maintain connection of the element which was at first connected with the input member with the output member and the element which was at first connected with the output member with the input member.

8. Transmission mechanism comprising, an input member, an output member, a nonrotatable sun gear, a rotatable gear, a planet pinion in mesh with both gears, a planet pinion carrier, a clutch normaly holding one of said members connected with the carrier, a second clutch normally holding the other of said members connected with the rotatable gear, means operable at a predetermined speed to release said one member from connection with the carrier and connect it to the rotatable gear, and means operable at a higher predetermined speed to release said other member from connection with the rotatable gear and connect it to the carrier.

9. An underdrive gear set comprising, an input member, an output member, a sun gear fixed against rotation, a ring gear permanently secured for rotation with the input member, a planet pinion carrier, planet pinions on said carrier in mesh with both gears, a speed responsive clutch on said output member normally operative to positively hold the output member connected in two way driving relation with the carrier but operable above a predetermined speed to release said output member from said carrier and connect it in two way driving relation to the ring gear, and means in said clutch mechanism whereby, during the change from one connection to the other, the driven member may rotate slower but not faster than the ring gear, and faster but not slower than the carrier.

10. Overdrive gear mechanism comprising, an input member, an output member, a sun gear fixed against rotation, a ring gear permanently secured for rotation with the output member, a planet pinion carrier, planet pinions on said carrier in mesh with both said gears, a speed responsive clutch on the input member, normally operative to positively hold the input member connected in two way driving relation with the ring gear but operative above a predetermined speed to release said input member from the ring gear and connect it in two way driving relation with the carrier, and means in said clutch mechanism whereby, during the change from one connection to the other, the driving member may rotate slower but not faster than the ring gear and faster but not slower than the carrier.

11. Overdrive gear mechanism comprising, an input member, an output member, a non rotatable sun gear, a coaxial gear fixed to the output member to rotate therewith, a planet pinion in mesh with both gears, a planet pinion carrier, a clutch on the input member normally clutching the coaxial gear in two way driving relation, but operable to clutch the carrier in two way driving relation and release the coaxial gear, and means operative, only during the change over of the clutch, to clutch both the coaxial gear and the carrier in one way driving relation whereby the input member may not rotate faster than the carrier nor slower than the coaxial gear.

12. Overdrive gear mechanism comprising, an input member, an output member, a non rotatable sun gear, a gear fixed to the output member to rotate therewith, a planet pinion in mesh with both gears, a planet pinion carrier, a clutch mechanism on the input member normally operative to drive the rotatable gear forwardly or to be driven forwardly thereby, but operable to drive the carrier forwardly or be driven forwardly thereby, and operative during the change over to drive the rotatable gear forwardly but not be driven forwardly thereby and to be driven forwardly by the carrier but not to drive said carrier forwardly.

13. Overdrive gear mechanism comprising, an input member, an output member, a non rotatable sun gear, a rotatable gear drivably connected to the output member, a planet pinion in mesh with both gears, a planet pinion carrier, a clutch mechanism on the input member, adapted in its normal state to drivably engage the rotatable gear to drive said gear forwardly or be driven forwardly thereby but completely disconnected from the carrier, said clutch being operable to an intermediate position to drive said rotatable gear forwardly but not be driven forwardly thereby, and to be driven forwardly by said carrier but not to drive said carrier forwardly, and operable to fully engaged position to drivably engage the carrier to drive said carrier forwardly and be driven forwardly thereby but completely disconnected from the said rotatable gear.

14. The combination in a transmission mechanism, of gearing having two concentric gear connected rotatable elements, the one always rotating faster than the other, and a rotatable clutch for engaging said rotatable elements normally operative to engage one of said rotatable elements to drive said element forwardly or be driven forwardly thereby but completely disconnected from the other rotatable element, said rotatable clutch being operable to an intermediate position to drive said one rotatable element forwardly but not be driven forwardly thereby, and to be driven forwardly by the second said element but not to drive said second element forwardly, and operable to fully engaged position to drivably engage the second said rotatable element to drive it forwardly and be driven forwardly thereby, but completely disconnected from the first said rotatable element.

15. The combination in a transmission mechanism, of gearing having two gear connected rotatable elements, the one always rotating faster than the other, and a rotatable clutch mechanism adapted for making a two way driving connection to both of said rotatable elements one at a time, and a one way driving connection to both of said rotatable elements at the same time, said one way driving connection being adapted to limit the speed of said clutch to a speed no faster than the faster element nor slower than the slower element.

16. The combination in a transmission mechanism, of two rotatable elements connected by gearing whereby one element always rotates faster than the other, a rotatable clutch mechanism adapted to be connected to said elements, a ratchet on each element, the two ratchets being of opposite hand, a pair of pawls on said clutch mechanism for engaging said ratchets operative when both are ratcheting to restrict the speed of the clutch mechanism to a speed not greater than the faster element nor slower than the slower element, a two way driving notch in each ratchet, a two way driving end on each pawl, and means connecting the two pawls whereby, when either driving end moves into its notch the other pawl is drawn clear of both its notch and its ratchet.

17. The combination in a transmission mechanism, of two rotatable elements connected by gearing whereby one element always rotates faster than the other, a rotatable clutch mechanism adapted to be connected to said elements, a ratchet on each element, each of opposite hand to the other, and each having a two way driving notch of greater depth than the ratchet teeth, two pawls on said clutch mechanism having ends adapted when entered to half depth to engage the ratchet teeth only and when entered more than half depth to engage the said notches, and means acting between the pawls whereby both pawls may be entered half depth at the same time but operative, when either pawl enters more than half depth to draw the other pawl to less than half depth.

18. In a power transmission, two rotatable elements, gears for connecting said elements, one rotatable element always rotating faster than the other rotatable element, a driving notch in each rotatable element, a rotatable member adapted to be connected alternately to one or the other of said elements, a clutch on said rotatable member comprising, a clutch frame secured to said rotatable member, two pawls on said frame one having an end adapted for engagement with one of said notches and the other having an end adapted for engagement with the other of said notches, spring means adapted to be stressed to urge said pawl ends into their notches, and a centrifugal weight movable to an "out" position to stress the spring means to urge engagement of one of the pawl ends with its notch, and movable to an "in" position to stress the spring means to urge engagement of the other pawl end with its notch.

19. The structure defined in claim 18 wherein the pawls are movably held in the frame but so placed with respect thereto that their movement is not substantially influenced by the centrifugal force of their own weight.

20. The structure defined in claim 18 wherein the ends of the pawls and the notches are so shaped that when a pawl enters half depth into its notch it provides a one way or ratchet drive, but when entered full depth into its notch it provides a two way drive.

21. The structure defined in claim 18 wherein there is a means extending from one pawl to the other whereby one pawl entering half way into its notch pulls the other pawl half way out of its notch to ratcheting position, and entry of one pawl full depth into its notch for a two way drive pulls the other pawl all the way out of its notch for complete disconnection.

22. The structure defined in claim 18 wherein there is means connecting the two pawls whereby neither pawl may start into the position in its notch which provides a two way drive without pulling the other pawl from its position in its notch which provides a two way drive.

23. The structure defined in claim 18 wherein one pawl is normally entered into its notch and the centrifugal weight has means cooperating with said pawls made operative upon movement of the weight from the "in" to the "out" position to positively move the entered pawl to the ratcheting position, and cooperating with said spring means to resiliently bias the entering pawl for entry into its two way drive position.

24. The structure defined in claim 18 wherein the centrifugal weight is biased to the "in" position by a spring and has means cooperating with the pawls operative upon movement of the weight from either of its positions to the other to positively move the entered pawl to the ratcheting position and resiliently bias the other pawl for entry into its two way drive position.

FREDERICK W. COTTERMAN.